United States Patent [19]

Brinati et al.

[11] Patent Number: 6,111,028

[45] Date of Patent: Aug. 29, 2000

[54] O-RINGS FROM IONICALLY CURABLE FLUOROELASTOMERS

[75] Inventors: Giulio Brinati, Milan; Vincenzo Arcella, Novara; Marco Apostolo, Bellinzago; Anna Staccione, Milan, all of Italy

[73] Assignee: Ausimont S.p.A., Milan, Italy

[21] Appl. No.: 08/955,751

[22] Filed: Oct. 22, 1997

[30] Foreign Application Priority Data

Oct. 25, 1996 [IT] Italy .................................. MI96A2216

[51] Int. Cl.⁷ ........................................ C08F 8/00
[52] U.S. Cl. ........................................ 525/326.3; 525/387
[58] Field of Search ................................ 525/326.3, 387

[56] References Cited

U.S. PATENT DOCUMENTS

| | | |
|---|---|---|
| 3,051,677 | 8/1962 | Rexford . |
| 3,752,787 | 8/1973 | de Brunner . |
| 3,876,654 | 4/1975 | Pattison . |
| 3,931,129 | 1/1976 | Kometani et al. .................... 525/326.3 |
| 4,123,603 | 10/1978 | Stewart, Jr. . |
| 4,233,427 | 11/1980 | Bargain et al. . |
| 4,259,463 | 3/1981 | Moggi et al. . |
| 4,524,197 | 6/1985 | Khan . |
| 4,789,717 | 12/1988 | Giannetti et al. . |
| 4,810,760 | 3/1989 | Strepparola et al. ................. 525/326.3 |
| 4,833,212 | 5/1989 | Yamada et al. ....................... 525/326.3 |
| 4,864,006 | 9/1989 | Giannetti et al. . |
| 5,319,025 | 6/1994 | Weigelt ................................. 525/326.3 |
| 5,648,429 | 7/1997 | Chiodini et al. ..................... 525/326.3 |
| 5,654,374 | 8/1997 | Arren et al. ......................... 525/326.3 |

FOREIGN PATENT DOCUMENTS

| | | |
|---|---|---|
| 0120462 | 10/1984 | European Pat. Off. . |
| 0182299 | 5/1986 | European Pat. Off. . |
| 0196904 | 10/1986 | European Pat. Off. . |
| 0280312 | 8/1988 | European Pat. Off. . |
| 0335705 | 10/1989 | European Pat. Off. . |
| 0360292 | 3/1990 | European Pat. Off. . |
| 0407937 | 1/1991 | European Pat. Off. . |
| 0445839 | 9/1991 | European Pat. Off. . |
| 0 570 762 A1 | 11/1993 | European Pat. Off. . |
| 0625526 | 11/1994 | European Pat. Off. . |
| 0661304 | 7/1995 | European Pat. Off. . |
| 0 683 149 A2 | 11/1995 | European Pat. Off. . |
| 0 684 276 | 11/1995 | European Pat. Off. . |
| 0684277 | 11/1995 | European Pat. Off. . |

OTHER PUBLICATIONS

Kirk–Othmer Encyclopedia of Chemical Technology, Third Edition, vol. 8, pp. 500–515.

*Primary Examiner*—Bernard Lipman
*Attorney, Agent, or Firm*—Arent, Fox, Kintner, Plotkin & Kahn

[57] ABSTRACT

O-rings obtainable from vinylidenfluoride (VDF)-based ionically cured copolymers having compression set lower than 20%.

29 Claims, No Drawings

O-RINGS FROM IONICALLY CURABLE FLUOROELASTOMERS

The present invention refers to cured fluoroelastomers having oustanding seal properties at high temperature measured as compression set on O-ring lower than 20% as defined hereinunder.

More particularly the cured fluoroelastomers of the present invention, which find application in the preparation of O-ring, have the indicated compression set values without requiring LONG post-curing times usually utilized in the industrial practice. The results are still more surprising if it is considered that time necessary to obtain said compression set values is 30' or lower compared with the 24 hours normally employed.

It is to be noticed moreover that already after press moulding, as defined hereunder, the compression set values are already sufficiently low for many applications.

It is well known that one of the most important applications of fluoroelastomers relates to the preparation of O-rings. These are obtained from fluoroelastomeric copolymers based on units deriving from vinylidenefluoride (VDF), hexafluoropropene (HFP) and optionally tetrafluoroethylene (TFE).

The commercial products utilized for this purpose have high elastomeric characteristics at low and at high temperatures and show good processability so that they can be easily injection molded with automatic cycles.

VDF-based fluoroelastomers show low compression set values, even lower than 20%. However, these require long post-curing time, generally in the range of 24 hours at the temperature of 250° C. This is a drawback at nowadays VDF-based fluoroelastomers, since it is impossible the automation of the injection molding production cycles and post-curing, due to the excessively long residence times in continuous device ovens.

It was felt the need to have available VDF-based fluoroelastomers to prepare O-ring requiring very short post-curing times, at least lower than or equal to 30', in order to make possible automatic production cycles as defined above.

Fluoroelastomers having post-curing times of 1 hour obtained by peroxidic curing are known in the art. In particular see European patent application EP 661304, which describes terpolymers based on VDF, HFP and/or perfluoroalkylvinylethers and TFE, showing low compression sets, but never lower than 20. These lower compression set values are obtainable only when the terpolymer has a high fluorine content (higher than 68% by weight). The compression set obtainable by using a VDF/HFP copolymer and/or perfluoroalkylvinylether, in absence of the TFE termonomer, shows higher compression set values and at any rate higher than 20%.

It was desirable to find a tonically curable VDF-based copolymer with good low temperature properties able to be processed by a less expensive technology without using the peroxidic curing which, as well known, shows remarkable difficulties during the transformation cycle. In particular the peroxidic curing is more laborious and requires a combination of technical expedients due to the peroxide unstableness besides problems of harmful toxic emissions during curing.

Taking into account the prior art on the curing of ionic type, no indications exist on how to reduce the post-curing time to values lower than 30' in order to use the above mentioned continuous automatic production cycles of molded manufatured articles.

For instance in U.S. Pat. No. 4,123,603 and EP 445839 in the name of the Applicant, are described terpolymers formed by VDF, HFP and TFE units in very narrow concentration ranges. They are ionically curable showing a satisfactory combination of properties at high and at low temperatures, and, at the same time, have good processability, especially as regards the mold releasing after curing. For this reason they are particularly suitable for the O-rings manufacture.

However, such terpolymers show the drawback of requiring long post-curing times to obtain manufactured articles with good final properties and, in particular, the compression set.

In the prior art described above it is possible to obtain sufficiently low compression set values at high temperatures, lower than 20%. In particular, such copolymers are capable to overcome commercial specifications such as the "Military Specification (MIL-R-83248B)", according to which the maximum value required for the compression set at 200° C. for 70 hours on O-ring, is 20%. It is to be noticed that said good compression set values are obtainable only after long post curing times, 250° C. for 24 hours.

It is an object of the present invention vinylidenefluoride (VDF) and hexafluoropropene (HFP)-based ionically cured copolymers showing a highly stable network giving a cured material only requiring very low or even zero post-curing time (at any rate lower than 30 minutes) to obtain a compression set value lower than 20%; the copolymer, before curing coming from the polymerization reactor and after latex coagulation, washing and drying, results highly stable to thermal degradation and the copolymer when submitted to thermal treatment at the temperature of 250° C. for 1 hour does not show at the FT-IR analysis the presence of peaks and/or bands and/or halos of the double bonds —CH═CF— at the frequency of 1720 cm$^{-1}$; moreover the copolymer, before curing, subjected to gel permeation chromatography (GPC) shows an amount less than 3% by weight, preferably lower than 2.5% by weight, of polymer fractions having molecular weight lower than 10,000, when the Mooney viscosity (ML 1+10 at 121° C.) is 20, and lower than 0.5% by weight when the Mooney viscosity is 50.

The Mooney viscosity indicated above is determined according to ASTM D 1646-82.

The measurement by gel permeation chromatography (GPC) of the molecular weight distribution is performed according to the following:

Utilized Equipment
Pump: Waters-Mod. 590
Detector: refraction index (HP 1047A)
Columns: precolumn plus 4 $10^6$ Angstrom (Å), $10^5$ 521, $10^4$ Å, $10^3$ Å, (Ultrastyragel) columns
Injection: injector (Rheodyne 7010)
Operating Conditions
Eluent: tetrahydrofurane (THF)
Eluent flow rate: 1 cm$^3$/min.
Sample concentration: 0.5% by weight
Loop injection: 200 microliters ($\mu$l)
Temperature: 30° C.
Process Acquisition System Data
software waters Millenium 2010 (2.15)
The calibration curve is obtained by Tecnoflon® copolymer VDF/HFP (80/20 by moles) fractionation in THF solution.

The coagulation, washing and drying procedure of the polymer from the polymerization latex is the following: addition of an electrolyte agent (alluminium sulphate) in amount of 5 g/l of latex; 6 washings with demineralized water (each washing carried out with 1 l of water per l of original latex); drying in oven at 80° C. for 24 hours.

In general, the Mooney viscosity of the copolymer, before curing, and without the addition of the curing ingredients as defined hereinunder, which can be utilized in the above mentioned injection and compression molding applications is comprised from 15 to 150, preferably from 20 to 100.

The curable fluoroelastomers, object of the present invention, are prepared by using as radical initiator an organic peroxide, which can be selected in particular from:
(a) dialkylperoxides, wherein alkyl has from 1 to 12 carbon atoms, for instance diterbutylperoxide (DTBP);
(b) dialkylperoxydicarbonates, wherein the alkyl has from 1 to 12 carbon atoms, for instance diisopropylperoxydicarbonate:
(c) diacylperoxides, wherein acyl has from 2 to 12 carbon atoms, for instance diacetylperoxide;
(d) peroxyesters having from 3 to 20 carbon atoms, for instance terbutylperoxyisobutyrate.

The process for preparing the fluoroelastomers of the invention comprises the copolymerization of the corresponding monomers in aqueous emulsion in the presence of an organic peroxide as defined above. The polymerization in emulsion can be carried out according to known methods such as for instance those described in Kirk Othmer, Encyclopaedia of Chemical Technology, vol. 8, pages 500 and seq., 1979.

The process temperature is comprised between 100 and 150° C., preferably between 105 and 130° C. One can operate at pressures comprised between 10 and 100 bar, preferably between 20 and 50 bar.

As known, the emulsion polymerization technique requires the presence of a surfactant. Particularly preferred are at least partially fluorinated surfactants, corresponding to the general formula:

wherein $R_f$ is a (per)fluoroalkylic chain $C^5-C_{16}$ or a (per)fluoropolyoxyalkylenic chain, $X^-$ is $-COO^-$ or $-SO_3^-$, $M^+$ is selected from: $H^+$, $NH_4^+$, an alkaline metal ion. Among the most commonly used we can cite: ammonium perfluorooctanoate, (per)fluoropolyoxyalkylenes terminated with one or more carboxylic groups, optionally salified with sodium, ammonium and alkaline metals, preferably sodium, partially fluorinated alkylsulphonates. See for instance U.S. Pat. No. 4,524,197.

Chain transfer agents selected from those commonly employed in the fluoroelastomers synthesis can be added to the reaction mixture. We can cite: hydrogen, hydrocarbons having from 1 to 12 carbon atoms, for instance methane, ethane, methylcyclopentane; chloro(fluoro)carbons having from 1 to 10 carbon atoms, optionally containing hydrogen, for instance chloroform, trichlorofluoromethane; esters, alcohols, ethers having from 1 to 12 carbon atoms, for instance ethylacetate, diethylmalonate, diethylether, isopropanol, and the like.

Other chain transfer agents can be generally used as molecular weight regulators. Among them, iodinated and/or brominated chain transfer agents, such as for instance the compounds of general formula $Rf_b(I)_x(Br)_y$ ($Rf_b$= perfluorinated hydrocarbon radical containing from 1 to 8 carbon atoms, x, y=integers comprised between 0 and 2, with at least x or y=1 and x+y≦2), are comprised.

If desired, iodides and/or bromides of alkaline or alkaline-earth metals can be used, according to the European patent application No. 407,937, which are not chain transfer agents.

After the polymerization in emulsion is completed, the fluoroelastomer is isolated from the polymeric latex with known methods, such as the coagulation by addition of electrolytes or by cooling. A detailed process has been described above.

The preparation of fluoroelastomers, object of the present invention, can be advantageously carried out in the presence of microemulsions of perfluoropolyoxyalkylenes, according to U.S. Pat. No. 4,864,006, or also of microemulsions of fluoropolyoxyalkylenes having hydrogenated terminals and/or hydrogenated repeating units, according to European patent 625,526.

The polymerization can be also advantageously carried out by using an emulsion or a dispersion of perfluoropolyoxyalkylenes and water according to the method described in the U.S. Pat. No. 4,789,717.

The emulsions and dispersions of perfluorooxyalkylenes and water described for instance in European patent applications 196,904, 280,312 and 360,292 can also be used.

The fluoroelastomers, object of the present invention, comprise VDF copolymers with HFP. Typical fluoroelastomer copolymers compositions are the following:
VDF 60–85% by moles, HFP 15–40% by moles, preferably VDF 75–80% by moles, HFP 20–25% by moles.

Besides copolymers also terpolymers or tetrapolymers having the essential characteristics indicated above for the VDF/HFP copolymers can be prepared. Tetrafluoroethylene (TFE), (per) fluoroalkylvinylethers (PAVE) $CF_2=CFOR_{fa}$, wherein $R_{fa}$ is a (per) fluoroalkyl $C_1-C_6$, for instance perfluoromethylvinylether, can be used a termonomers.

Suitable compositions are the following:

| VDF 60–75 | % by moles |
|---|---|
| HFP 12–22 | " |
| PAVE 0–5 | " |
| TFE 3–20 | ". |

When PAVE is present, generally it partially substitutes HFP.

Also small amounts of units deriving from a fluorinated bis-olefin can be present in the polymer as described in European patent application EP 661,304 in the name of the Applicant incorporated herein by reference; the amount of bisolefin is generally comprised between 0.01–1% by moles.

The fluoroelastomers object of the present invention can also contain units deriving from non fluorinated ethylenically unsaturated monomers, in particular non fluorinated olefins (Ol) $C_2-C_8$, in amounts generally comprised between 0%–10% by moles, such as for instance ethylene and propylene, preferably ethylene.

The fluoroelastomers object of the present invention are ionically cured, as known in the art.

For the cross-linking curing and accelerating agents well known in the art are used. The amount of the accelerant agent is comprised between 0.05–5 phr, the curing agent between 0.5–15 phr, preferably 1–6 phr. For instance, as curing agents, aromatic or aliphatic polyhydroxyl compounds, or their derivatives, can be employed, as described for instance in EP-335,705 and U.S. Pat. No. 4,233,427. Among them in particular we can mention: di-, tri- and tetrahydroxy benzenes, naphthalenes or anthracenes; bisphenols wherein the two aromatic rings are connected each other through a bivalent aliphatic, cycloaliphatic or aromatic radical, or through an oxygen or sulphur atom, or also a carbonyl group. The aromatic rings can be replaced by one or more atoms of chlorine, fluorine, bromine, or by carbonyls, alkyls, acyls. In particular the bisphenol AF is preferred. As accelerating agents we can cite for instance: quaternary ammonium or phosphonium salts (see for instance EP-335,705 and U.S. Pat. No. 3,876,654); aminophosphonium salts (see for instance U.S. Pat. No. 4,259,463); phosphoranes (see for instance U.S. Pat. No. 3,752,787); the imino compounds described in EP-182,299 and EP-120,462; etc. The quaternary ammonium or phosphonium salts and the aminophosphonium ones are preferred.

Instead of using the acceleranting and the curing agents separately, an adduct of the two substances, in a molar ratio from 1:2 to 1:5, preferably from 1:3 to 1:5, can also be used in amounts from 1 to 5 phr (2 to 4.5 preferred). The acceleranting agent being one of the onium-organic compounds having a positive charge, as defined above. The curing agent being selected among the compounds indicated above, in particular di- or polyhydroxylic or di- or polythiolic. The adduct being obtained by melting the product of the reaction between the acceleranting and the curing agents, in the indicated molar ratios or by melting the 1:1 adduct mixture with the curing agent in the indicated amounts. Optionally it can be present also an excess of the acceleranting agent with respect to that contained in the adduct, generally in amounts from 0.05 to 0.5 phr.

For preparing the adduct, the following cations are particularly preferred: 1,1-diphenyl-1-benzyl-N-diethylphosphoranamine and tetrabutyl phosphonium or ammonium; among anions, particularly preferred are, bisphenol compounds wherein the two aromatic rings are linked by a bivalent radical selected among the perfluoroalkylic groups from 3 to 7 carbon atoms and the OH in para position.

The adduct can be prepared as follows.

The cross-linking agent such as the polyhydroxylic or polythiolic compound, is reacted in aqueous solution or in a suitable solvent, for instance methanol, wherein the acceleranting agent is soluble, in a first stage, with a basic substance (for instance NaOH, KOH, Ca(OH)$_2$ and tBuO$^-$K$^+$) by using generally an equivalent gram of basic substance per mole of polyhydroxylic or polythiolic compound. The reaction product is then reacted in a second stage with the acceleranting agent salt (for instance chloride). The desired salt precipitates. After filtering and drying, the product is melted, and after cooling, solidifies in flakes or pellets giving the adduct used in the present invention. The so prepared adduct is particularly suitable for its handling and its incorporation in the cross-linkable compounds.

The adduct preparation is described in the European patent application EP 684 277 in the name of the Applicant herein incorporated by reference.

The curing blend contains moreover
i) one or more inorganic acids acceptors selected from those known in the ionic curing of the vinylidenefluoride copolymers, in amounts 1–40 parts per 100 parts fluoroelastomeric copolymer;
ii) one or more basic compounds selected from those known in the ionic curing of vinylidene fluoride copolymers, in amounts from 0.5 to 10 parts for 100 parts of fluoroelastomeric copolymer.

The basic compounds mentioned in point ii) are commonly selected in the group of Ca(OH)$_2$, Sr(OH)$_2$, Ba(OH)$_2$, metal salts of weak acids, such as for instance carbonates, benzoates, oxalates and phosphites of Ca, Sr, Ba, Na and K and mixtures of the hydroxides mentioned above with the above metal salts; among the compounds of type i) MgO can be mentioned.

The indicated amounts of the components of the compound are referred to 100 phr of copolymer or terpolymer of the invention. Other conventional additives, such as thickeners, pigments, antioxidants, stabilizers and the like, can be added to the curing compound.

It has been moreover found that the cured fluoroelastomers of the present invention can find application also as gaskets, shaft seals, hoses.

They are also suitable for gaskets with metal inserts utilized for pieces of big sizes for applications in automotive and chemical industry. It is well known that for pieces of remarkable sizes the post curing procedure is extremely difficult.

For these applications the fluoroelastomers of the present invention after press curing at high temperature, generally between 170° C. and 230° C., show values of final properties, such as mechanical properties and compression set, already reading their final stable values. This means that at high temperature working condition, generally between 100° C. and 200° C., the values of the final properties remain almost unchanged. It has been found indeed that the compression set, after press moulding at 170° C. for a few minutes, generally in the range of 10 minutes, reaches a value lower than 30%. This low value is what required for these kinds of manufactured articles. This result is obtained without the need of long time and high temperature post curing process.

When a higher chemical resistance is required, for instance higher resistance to polar solvents, compositions based on VDF and the other above mentioned comonomers, in mixtures having a fluorine content higher than 68% by weight, can be used.

The present invention will be now better illustrated by the following examples which have a merely indicative purpose but it is not limitative of the scope of the present invention.

EXAMPLES

Preparation of the Microemulsion

In a glass reactor equipped with stirrer, under mild agitation, the following components for the preparation of 1 kg of microemulsion are fed as follows. The correspondence by volume is equal to 782 ml.
1) 170 ml of acid are introduced in the reactor, which have a number average molecular weight 600 and have the formula:

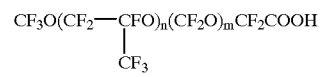

wherein n/m=10
2) 170 ml of a 30% by volume aqueous emulsion of ammonium hydroxide are added;
3) 340 ml of demineralized water are added;
4) 102 ml of Galden® D02 are added, having the formula:
$CF_3O(CF_2—CF(CF_3)O)_n (CF_2O)_m CF_2COOH$
wherein n/m=20 and having average molecular weight of 450.

Example 1

In a 21 l horizontal reactor, equipped with stirrer working at 50 rpm, 15 l of water and 150 g of the microemulsion prepared according to the procedure described are introduced.

The reactor is heated up to 122° C. and then brought to the pressure of 35 relative bar by feeding monomers until the following composition of the top reactor gas phase was obtained:
VDF=53% moles HFP=47% moles.

After introducing 12 g of diterbutylperoxide (DTBP) the reaction is started and the pressure is maintained constant for the whole polymerization by feeding a mixture consisting of:

VDF=78.5% moles
HFP=21.5% moles

After a prefixed amount of reacted monomeric mixture corresponding to 4500 g, the reaction is stopped. The polymerization total time results equal to 265 minutes.

The latex having a concentration of 271 g/l latex is then coagulated by using an electrolyte agent (aluminium sulphate), washed and dried at 80° C. for 24 h.

The obtained polymer shows a mooney viscosity ML (1+10 at 121° C.) equal to 51.

The $^{19}F$ NMR analysis shows the following composition: 79.3% by moles of HFP, 20.7% by moles of VDF.

The other chemical physical properties, intrinsic viscosity and polydispersity indexes obtained by GPC. are shown in Tab. 1.

The material has been formulated as in Tab. 2a. M1 is a master batch 50/50 by weight of bisphenol AF with Tecnoflon® copolymer 80/20 by moles of VDF/HFP; M2 is a master batch 30/70 by weight of 1,1-diphenyl-1-benzyl-N-diethylphosphoranamine. The rheometric, ODR, mechanical and compression set data with different post-curing times are shown in Tabs 2a, 3a, 2b and 3b.

Example 2

The same reactor of Example 1 is utilized. Material charges, stirring, temperature, pressure, initial loading and monomers continuous feeding conditions are equal to those of Example 1. Also in this case 12 g of DTBP are fed to start the reaction.

Moreover 30 g of 1,6-diiodoperfluorohexane ($C_6F_{12}I_2$), as chain transfer agent, in the form of a solution obtained by dissolving it in 18 ml of Galden® D02 are fed before the reaction is started.

The following bis-olefin is also added:

$$CH_2=CH(CF_2)_6CH=CH_2$$

The initially amount added is equal to 0.23 g dissolved in 1 ml of Galden® D02, and other 19 solution inserts are carried out every 210 g of reacted monomer. Each insert is equal to the initially amount added.

During the reaction, further 6 g of DTBP are added after 300 minutes and 2600 g of reacted monomer.

The reaction is stopped after a prefixed amount of reacted monomer, equal to 4200 g, which corresponds to a total polymerization time of about 430 minutes.

The resulting latex, having a concentration of 250 g/l is coagulated by aluminium sulphate washed and dried at 80° C. for 24 h (see the procedure in the description).

The obtained polymer results to have a mooney viscosity ML (1+10 at 121° C.) of 39.

The $^{19}F$ NMR analysis shows the following composition: 79.2% by moles of HFP, 20.8% by moles of VDF.

The other chemical physical properties, intrinsic viscosity and polydispersity indexes obtained by GPC are shown in Tab. 1.

The material has been formulated as in Tab 3a and the rheomotric, ODR, mechanical and compression set data with different post-curing times are shown in Tab. 3a and 3b.

Example 3 Comparative

In a 10 l vertical reactor, equipped with stirrer working at 545 RPM, 6.5 l of water are introduced. The reactor is then heated to the initial temperature of 85° C. and at a pressure of 19 relative bar with VDF and HFP in the following monomeric composition VDF=53% moles, HFP=47% moles.

Subsequently the reaction is started by the addition of 9.8 g of ammonium persulphate as a 150 g/l aqueous solution.

At the start of the reaction 10 g of ethyl acetate are fed as a 5.6% by weight aqueous solution.

During the polymerization reaction the pressure is kept constant by feeding the monomers in the following molar ratios:

VDF=78.5% moles
HFP=21.5% moles

After 120 minutes and a consumption of the monomeric mixture of 2800 g, the reaction is stopped.

The resulting latex having a concentration of 350 g/l, is coagulated by aluminium sulphate, washed and dried at 80° C. for 24 h as in example 2.

The obtained polymer shows a mooney viscosity ML (1+10 at 121° C.) of 32.

The $^{19}F$ NMR analysis shows the following composition: 79.0% by moles of HFP, 21.0% by moles of VDF.

The other chemical physical properties, intrinsic viscosity and polydispersity indexes obtained by GPC are shown in Tab. 1.

The material has been formulated as in Tabs. 2a and 3a and the rheometric, ODR, mechanical and compression set data with different post-curing times are shown in Tabs 2b and 3b.

TABLE 1

| EXAMPLE | 1 | 2 | 3 cfr |
|---|---|---|---|
| MOONEY VISCOSITY (1 + 10 at 121° C.) | 51 | 39 | 32 |
| INTRINSIC VISCOSITY (ASTM D 1416-83) (ml/g) | 88 | 83 | 90 |
| GPC (ASTM D 3593-80) Mw/Mn | 3.6 | 5.6 | 5.5 |
| FRACTION BY WEIGHT HAVING M < 10000 | 0.4% | 1.4% | 1.4% |
| FT-IR APPEARANCE PEAK OR BAND AT 1720 $cm^{-1}$ AFTER THERMAL TREATMENT 250° C. × 1 h | NO | NO | YES |

TABLE 2a

|  |  | Compound 1 | Compound 3 (comp.) |
|---|---|---|---|
| Polymer Ex. 1 | phr | 100 | — |
| Polymer Ex. 3 (comp.) | " | — | 100 |
| M1 | " | 4 | 4 |
| M2 | " | 1.5 | 1.5 |
| MgO-De | " | 3 | 3 |
| Ca(OH)$_2$ | " | 6 | 6 |
| Black MT | " | 30 | 30 |
| Rheometric properties Mooney raw polymer | | | |
| ML (1 + 10 at 121° C.) | | 51 | 32 |
| Mooney Compound | | | |
| ML 121°,1 + 10' | | 76 | 57 |
| ODR at 177° C., arc 3°,12' | | | |
| ML | lbf.in | 14 | 8 |
| MH | lbf.in | 101 | 104 |
| ts2 | s | 129 | 141 |
| ts10 | s | 159 | 174 |

TABLE 2a-continued

|  |  | Compound 1 | Compound 3 (comp.) |
|---|---|---|---|
| t'50 | s | 183 | 196 |
| t'90 | s | 204 | 231 |
| Vmax | lbf.in/s | 2.54 | 2.56 |

TABLE 2b

|  |  | Compound 1 | Compound 3 (comp.) |
|---|---|---|---|
| After press 170° C. × 10' | | | |
| M100% | MPa | 3.9 | 4.2 |
| Stress at break | MPa | 10.4 | 10.4 |
| Elong. at break | % | 272 | 259 |
| Shore hardness A | points | 69 | 70 |
| C.Set O-ring 200° C. × 70 h | % | 31 | 37 |
| Post-cure at 250° C. × 30 min. | | | |
| M100% | MPa | 4.4 | 5.3 |
| Stress at break | MPa | 12.7 | 13.5 |
| Elong. at break | % | 239 | 228 |
| Shore A hardness | points | 70 | 71 |
| C.Set O-ring 200° C. × 70 h | % | 18 | 27 |
| Post-cure at 250° C. × 8 + 16 h | | | |
| M100% | MPa | 5.1 | 5.8 |
| Stress at break | MPa | 14.3 | 14.1 |
| Elong. at break | % | 214 | 196 |
| Shore hardness A | points | 70 | 72 |
| C.Set O-ring 200° C. × 70 h | % | 18 | 18 |

TABLE 3a

|  |  | Compound 1 | Compound 2 | Compound 3 (comp.) |
|---|---|---|---|---|
| Polymer Ex. 1 | phr | 100 | — | — |
| Polymer Ex. 2 | " | — | 100 | — |
| Polymer Ex. 3 (comp.) | " | — | — | 100 |
| M1 | " | 5 | 5 | 5 |
| M2 | " | 1.5 | 1.5 | 1.5 |
| MgO-De | " | 3 | 3 | 3 |
| Ca(OH)$_2$ | " | 6 | 6 | 6 |
| Black MT | " | 20 | 20 | 20 |
| Rheometric properties Mooney raw polymer | | | | |
| ML 121°,1 + 10' | | 51 | 39 | 32 |
| Mooney compound | | | | |
| ML 121°,1 + 10' | | 69 | 56 | 49 |
| ODR at 177° C., arc 3°,12' | | | | |
| ML | lbf.in | 12 | 10 | 7 |
| MH | lbf.in | 108 | 105 | 111 |
| ts2 | s | 168 | 186 | 207 |
| ts10 | s | 207 | 228 | 257 |
| t'50 | s | 237 | 255 | 288 |
| t'90 | s | 261 | 279 | 324 |
| Vmax | lbf.in | 2.39 | 2.34 | 2.2 |

TABLE 3b

|  |  | Compound 1 | Compound 2 | Compound 3 (comp.) |
|---|---|---|---|---|
| After press 170° C. × 10' | | | | |
| M100% | MPa | 3.4 | 3.7 | 4.0 |
| Stress at break | MPa | 10.1 | 10.3 | 10.3 |
| Elong. at break | % | 233 | 227 | 216 |
| Shore A hardness | points | 64 | 64 | 67 |
| C.Set O-ring 200° C. × 70 h | % | 28 | 27 | 32 |
| Post-cure at 250° C. × 30 min. | | | | |
| M100% | MPa | 3.9 | 4.0 | 4.7 |
| Stress at break | MPa | 11.5 | 11.6 | 12.7 |
| Elong. at break | % | 206 | 203 | 199 |
| Shore A hardness | points | 64 | 65 | 66 |
| C.Set O-ring 200° C. × 70 h | % | 14 | 14 | 23 |
| Post-cure at 250° C. × 8 + 16 h | | | | |
| M100% | MPa | 4.6 | 4.5 | 5.3 |
| Stress at break | MPa | 14.0 | 11.8 | 14.4 |
| Elong. at break | % | 196 | 188 | 201 |
| Shore A hardness | points | 64 | 64 | 67 |
| C.Set O-ring 200° C. × 70 h | % | 14 | 14 | 15 |

What is claimed is:

1. Vinylidenefluoride (VDF) and hexafluoropropene (HFP)-based ionically cured copolymers showing a highly stable network and such that the cured material needs a very low post-curing time, lower than 30 minutes which can be also zero, to obtain compression set lower than 20%; the copolymer before curing, deriving from the polymerization latex after coagulation, washing and drying, resulting highly stable to thermal degradation and when submitted to thermal treatment at 250° C. for 1 hour, does not show at the FTIR analysis the presence of peaks and/or bands and/or halos of the double bonds —CH=CF— at the frequency of 1720 cm$^{-1}$; moreover the copolymer before curing shows by gel permeation chromatography (GPC) a polymer fraction having molecular weight lower than 10,000 in amount lower than 3% by weight, when the Mooney viscosity (ML 1+10 at 121° C.) is 20 and lower than 0.5% by weight when the Mooney viscosity is 50.

2. Vinylidenefluoride (VDF) and hexafluoropropene (HFP)-based ionically cured copolymers according to claim 1, wherein the copolymer, before curing and without the addition of curing ingredients, has a Mooney range varying from 15 to 150.

3. Vinylidenefluoride (VDF) and hexafluoropropene (HFP)-based ionically cured copolymers according to claim 1, wherein the monomer composition is VDF 60–85% by moles, and HFP 15–40% by moles.

4. Vinylidenefluoride (VDF) and hexafluoropropene (HFP)-based ionically cured copolymers according to claim 3, wherein the fluoroelastomer contains also one or more termonomers selected from tetrafluoroethylene (TFE), (per) fluoroalkylvinylkethers (PAVE) $CF_2$=$CFOR_{fa}$, wherein $R_{fa}$ is a (per)fluoroalkyl $C_1$–$C_6$.

5. Vinylidenefluoride (VDF) and hexafluoropropene (HFP)-based ionically cured copolymers according to claim 4, wherein the composition is:

| | % by moles |
|---|---|
| VDF 60–75 | " |
| HFP 12–22 | " |
| PAVE 0–5 | " |
| TFE 3–20 | ". |

6. Vinylidenefluoride (VDF) and hexafluoropropene (HFP)-based ionically cured copolymers according to claim 1, wherein also a fluorinated bis-olefin in amounts comprised between 0.01–1% by moles is present.

7. Vinylidenefluoride (VDF) and hexafluoropropene (HFP)-based ionically cured copolymers according to claim 1, wherein units deriving from non fluorinated (Ol) $C_2$–$C_8$ olefins in amounts comprised between 0% and 10% by moles, are present.

8. Vinylidenefluoride (VDF) and hexafluoropropene (HFP)-based ionically cured copolymers according to claim 7, wherein the olefin is ethylene.

9. Vinylidenefluoride (VDF) and hexafluoropropene (HFP)-based ionically cured copolymers according to claim 1 wherein the material to be cured contains 100 phr of fluoroelastomer, curing and accelerating agents, the amounts of the accelerating agent being comprised between 0.05 and 5 phr and those of the curing agent between 0.5 and 15 phr.

10. Vinylidenefluoride (VDF) and hexafluoropropene (HFP)-based ionically cured copolymers according to claim 9, wherein the curing agents are selected from polyhydroxyl, aromatic or aliphatic compounds, or derivatives thereof.

11. Vinylidenefluoride (VDF) and hexafluoropropene (HFP)-based ionically cured copolymers according to claim 9, wherein the accelerating agent is selected from: quaternary ammonium or phosphonium salts, amino-phosphonium salts.

12. Vinylidenefluoride (VDF) and hexafluoropropene (HFP)-based ionically cured copolymers according to claim 11, wherein the accelerating agent is 1,1-diphenyl-1-benzyl-N-diethyl-phosphoranamine and/or tetrabutyl phosphonium.

13. Vinylidenefluoride (VDF) and hexafluoropropene (HFP)-based ionically cured copolymers according to claim 9, wherein the accelerating and the curing agents are combined to form an adduct in molar ratio from 1:2 to 1:5, in amounts from 1 to 5 phr.

14. Vinylidenefluoride (VDF) and hexafluoropropene (HFP)-based ionically cured copolymers according to claim 9 wherein the curing compound contains:
   i) one or more acceptors of inorganic acids selected from those known in the ionic curing of vinylidenefluoride copolymers, in amounts 1–40 parts per 100 parts fluoroelastomeric copolymer;
   ii) one or more basic compounds selected from those known in ionic curing of vinylidene fluoride copolymers, in amounts from 0.5 to 10 parts for 100 parts of fluoroelastomeric copolymer.

15. Process for preparing curable copolymers according to claim 1, comprising the copolymerization of monomers in aqueous emulsion in the presence of an organic peroxide, the temperature being comprised between 100 and 150° C.

16. Process for preparing curable copolymers according to claim 15, wherein the organic peroxide is selected from:
   (a) dialkylperoxides, wherein alkyl has from 1 to 12 carbon atoms, for instance diterbutylperoxide (DTBP);
   (b) dialkylperoxydicarbonates, wherein the alkyl has from 1 to 12 carbon atoms, for instance diisopropylperoxydicarbonate;
   (c) diacylperoxides, wherein acyl has from 2 to 12 carbon atoms, for instance diacetylperoxide;
   (d) peroxyesters having from 3 to 20 carbon atoms, for instance terbutylperoxyisobutyrate.

17. Process for preparing curable copolymers according to claim 15, wherein also a surfactant is present.

18. Process for preparing curable copolymers according to claim 17, wherein the surfactant has the general formula:

wherein $R_f$ is a (per)fluoroalkylic chain $C_5$–$C_{16}$, a (per)fluoropolyoxyalkylenic chain, $X^-$ is —$COO^-$ or —$SO_3^-$, $M^+$ is selected from: $H^+$, $NH_4^+$, an alkaline metal ion.

19. Process for preparing curable copolymers according to claim 15, wherein a chain transfer agent is present.

20. Process for preparing curable copolymers according to claim 19, wherein the transfer agent is selected from: hydrogen, hydrocarbons having from 1 to 12 carbon atoms, methylcyclopentane, chloro(fluoro)carbons having from 1 to 10 carbon atoms, optionally containing hydrogen, esters, alcohols, ethers having from 1 to 12 carbon atoms, iodinated and/or brominated chain transfer agents having general fromula $Rfb(I)_x(Br)_y$ wherein Rfb is a perfluorinated hydrocarbon radical containing from 1 to 8 carbon atoms, x, y=integers comprised between 0 and 2, with at least x or y=1 and $x+y \leq 2$.

21. Process for preparing curable copolymers according to claim 15, wherein the polymerization is carried out in the presence of microemulsions of perfluoropolyoxyalkylenes or fluoropolyoxyalkylenes having hydrogenated terminals and/or hydrogenated repeating units.

22. Process for preparing manufactured articles by using the copolymers of claim 1 by press curing at a temperature between 170° and 230°.

23. Manufactured articles obtainable by the process of claim 22.

24. Manufactured articles according to claim 23 consisting of O-rings.

25. Process according to claim 22, wherein the cured copolymers have a fluorine content higher than 68% by weight wherein said copolymers are used after press molding.

26. Manufactured articles obtainaed from the copolymers of claim 1 selected from the group consisting of gaskets, shaft seals, hoses and gaskets with metal inserts.

27. Vinylidenefluoride (VDF) and hexafluoropropene (HFP)-based ionically cured copolymers according to claim 9, wherein the curing agent is bisphenol AF.

28. Vinylidenefluoride (VDF) and hexafluoropropene (HFP)-based ionically cured copolymers according to claim 9, wherein the accelerating and the curing agents are combined to form an adduct in molar ratio from 1:2 to 1:5, in amount from 1 to 5 phr, but an excess of accelerating agent being present with respect to that contained in the adduct in amounts from 0.05 to 0.5 phr.

29. Process according to claim 22, wherein the cured copolymers have a fluorine content higher than 68% by weight wherein said copolymers are used after press molding and also subjected to post-curing for a time lower than or equal to 30 minutes.

* * * * *